United States Patent Office 3,358,844
Patented Dec. 19, 1967

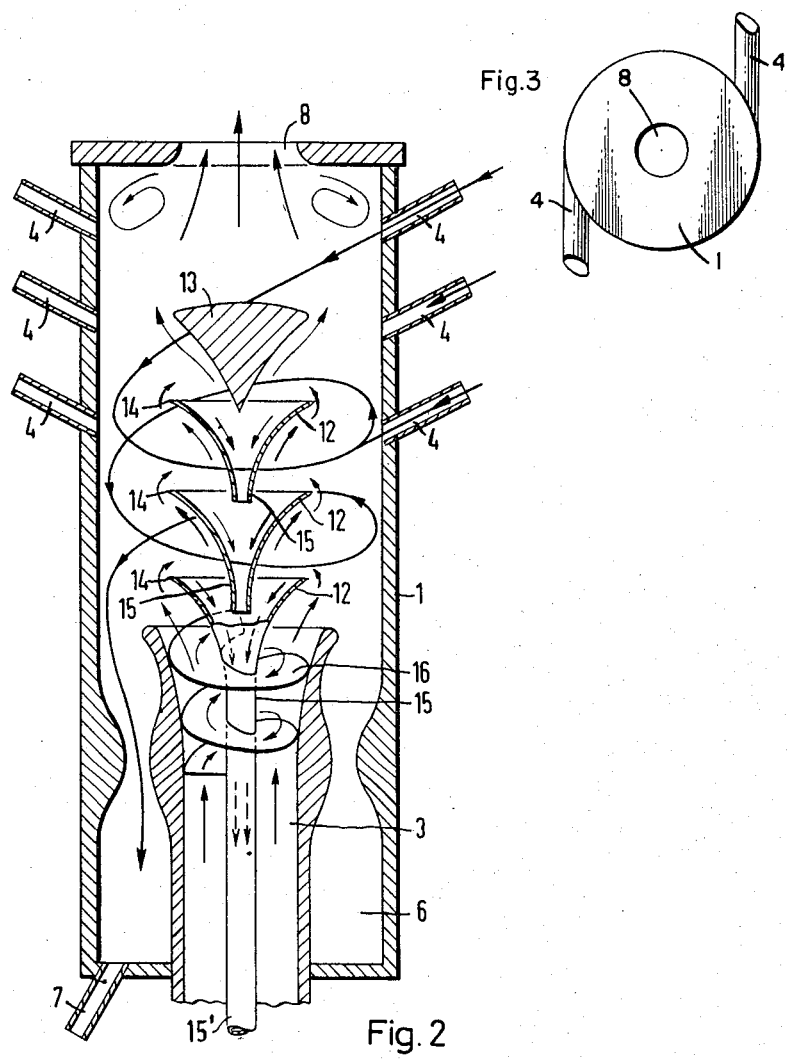
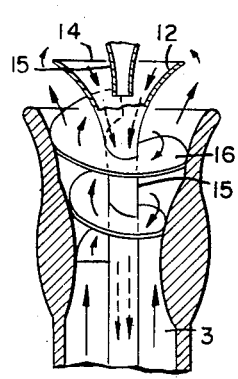

3,358,844
DEVICE FOR INCREASING THE TOTAL AMOUNT OF SEPARATION OF A VORTEX SEPARATOR
Heinrich Klein and Rudolf Pieper, Erlangen, Germany, assignors to Siemens-Schuckertwerke Aktiengesellschaft, Berlin and Erlangen, Germany, a corporation of Germany
Filed Aug. 17, 1965, Ser. No. 480,458
7 Claims. (Cl. 210—512)

ABSTRACT OF THE DISCLOSURE

In a "tornado flow" vortex separator, flow guide means having a rotationally symmetrical shape and extending coaxial to and inside the circulatory flows within the vortex chamber of the separator, the flow guide means having an end of minimum cross-sectional area located at primary flow inlet means at one end of the chamber, the cross-sectional area of the flow guide means increasing to a maximum value in the primary flow direction from the end of minimal cross-sectional area and then decreasing in the direction again to a minimum value, the rate of increase in cross-sectional area per unit length of the flow guide means being greater than the rate of decrease per unit length thereof.

Our invention relates to a device for increasing the total amount of separation of a vortex separator of the so-called "tornado flow" or "Dreh"-flow separator type. For a further understanding of the principles of operation of such separators and the various ways in which they may be applied, reference may be had, for example, to copending application Serial No. 835,886, filed Aug. 25, 1959, and now U.S. Patent 3,199,268; Serial No. 24,391, filed Apr. 25, 1960, and now U.S. Patent 3,199,269; Serial No. 862,570, filed Dec. 29, 1959, and now abandoned and Serial No. 98,604, filed Mar. 27, 1961 and now U.S. Patent 3,199,270, all of Oehlrich et al. and assigned to the assignee of the present application.

A vortex separator of this type comprises a cylindrical vortex chamber, at one end of which there is located coaxial to the chamber an inlet tube for supplying aerosol or particulate material entrained in a carrier fluid into the chamber. The purified liquid or gaseous carrier medium discharges from the vortex chamber in the axial direction at the other end thereof. A liquid or gaseous secondary medium is passed into the vortex chamber through supply lines located in the wall of the vortex chamber and tangentially inclined to the aerosol flow direction. A twisting motion comparable to that produced by the rifling in the barrel of a gun is thereby produced in the vortex chamber, by means of which the suspended particles of the areosol are able to be separated from the carrier medium and conducted into the collecting space concentrically surrounding the aerosol inlet tube.

The following glossary of terms will aid in understanding the invention and the underlying fluid mechanics phenomena that are involved, as described hereinafter:

*Potential flow*, assuming a homogeneous and friction-free flow, denotes a flow wherein the individual fluid particles do not rotate respectively about their own axes.

*Rotational flow* denotes a flow wherein the individual fluid particles rotate respectively about their own axes.

*Solid ground* denotes, for example, a plate which extends transversely to the flow direction, upon which the flow impinges and is deflected thereby.

*Source* denotes a point between two parallel plates from which a fluid flows uniformly outwardly in all directions.

*Sink* or *Vortex-sink* denotes a point between two parallel plates into which a fluid flows uniformly from all directions.

According to more recently acquired knowledge, the potential flow type of circulatory flow with a velocity component in the axial direction is excited by the secondary medium in the peripheral region of the separator, which impresses a circulation on the aerosol flow that is directed opposite thereto. At the mouth of the aerosol inlet, a flat vortex sink is formed above which the largest portion of the secondary medium flows into the region near the axis and there impresses on the aerosol flow a rotational flow circulating in the same rotary direction as the potential flow and having an axial velocity component in the direction of the aerosol flow. By means of the combination of flows thus formed as well as by an additional source effect at several levels above the mouth of the aerosol inlet, a large portion of the suspended particles is passed into the potential circulation flow and conducted therefrom into the collection space at the aerosol inlet.

Part of the suspended particles, particularly the smallest particles having little mass, remains, however, in the axial region of the vortex chamber. These suspended particles are thus located in the region of the rotational flow and are therefore conducted upwardly, in the flow of the purified carrier medium, particularly into the central or core zone, which surrounds the axis and in which the centrifugal forces virtually disappear. It is then possible, by increasing the energy of the secondary medium, i.e. by increasing the velocity thereof, to increase the centrifugal force and thereby remove an additional portion of the fine granular dust located in the core zone. This method is however of only limited utility because of economic considerations and also because of physical considerations.

Consequently, there is a limit to the quite remarkable separating efficiency of a vortex separator of the "torando"-flow type insofar as it is concerned with the separation of very fine granular particles. Thus, for example, with such a vortex separator acting as a dust remover for smoke, virtually 100% of the particles up to a size of about $5\mu$ are separated, whereas the percentage is always less for smaller particles. Since very small particles are very dangerous for the respiratory organs, however, and easily settle in those organs, the need arises for improving the efficiency of the vortex separator for separating the most fine-grained of the aerosol component particles.

It has already become known to provide above the mouth of the aerosol inlet a substantially drop-shaped flow body having approximately the diameter of the core zone, in order to shield from the aerosol flow, during the particle separation process, the singular axis of the vortex separator, in which no separation forces are operative, and to improve the separation efficiency thereby.

It is accordingly an object of our invention to provide improved flow guide means or streamline bodies for vortex separators, by means of which further improvement in the efficiency of separating very fine granular suspended particles can be achieved.

With the foregoing and other objects in view, we accordingly provide an improvement in vortex separators for separating out particulate material entrained in a carrier fluid. The separator comprises a vortex chamber having a substantially cylindrical wall and a pair of opposite end walls, inlet means at one of the end walls for supplying a primary flow of carrier fluid with entrained material to the chamber in a circulatory path about a primary flow axis, outlet means at the other of the end walls for discharging the carrier fluid from the chamber, a collection space for the material separated from the carrier fluid, the collection space being located in the chamber and surrounding the inlet means, nozzle means in the substantially cylindrical wall for injecting secondary fluid in a direction tangential to the circulatory path of the primary flow and inclined with respect to the primary flow axis at a predetermined distance from the inlet means. The secondary fluid is injected along a helical flow path into the chamber and has a component opposed to the primary flow so that a circulatory secondary flow coaxial with the circulatory primary flow is superimposed on the primary flow and a vortex sink and a vortex source spaced from each other along the primary flow axis are formed.

In accordance with an aspect of our invention we provide an improvement in the foregoing vortex separators comprising a flow guide means having a rotationally symmetrical shape and extending coaxial to and inside the circulatory flows. The flow guide means has an end of minimum cross-sectional area located at the primary flow inlet means, the cross-sectional area of the flow guide means increasing to a maximum value in the primary flow direction from the end of minimal cross-sectional area and then decreasing in that direction again to a minimum value. The rate of increase in cross-sectional area per unit length of the flow guide means is greater than the rate of decrease per unit length thereof.

The features which are considered as characteristic for the invention are set forth in the appended claims.

Although the invention is illustrated and described herein as embodied in a device for increasing the total separation rate of a vortex separator for solid or liquid aerosols, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 and 2 are vertical sectional views through two different embodiments of a vortex separator constructed in accordance with our invention.

FIG. 3 is a top plan view of the embodiment of FIG. 1; and

FIG. 4 is a fragmentary view of FIG. 2 showing a modification thereof.

Figure 1:
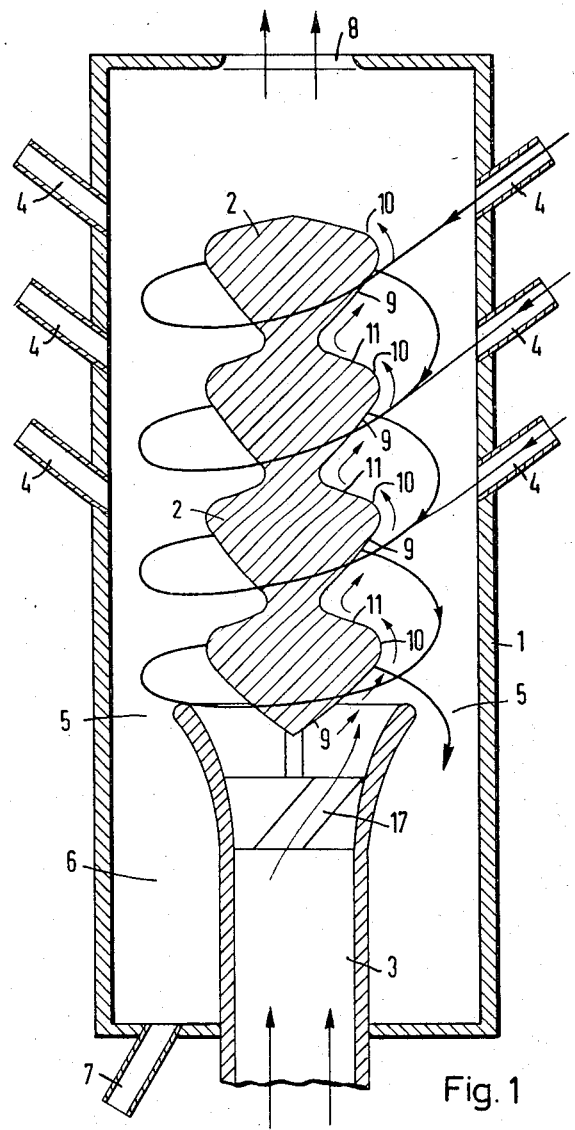

Referring now to the drawings and first particularly to FIG. 1, there is shown a vertical section through a vortex separator 1, in which a flow guide body or streamlined body 2 constructed in accordance with the invention is located. A carrier fluid entraining particulate material or an aerosol is supplied in the direction of the associated arrows through the primary flow or aerosol inlet 3. For a gaseous aerosol, for example, an auxiliary gas is advantageously supplied, in a direction opposite to the flow direction of the aerosol, in a secondary flow through nozzles 4 which extend in a tangentially inclined direction with respect to the vortex chamber walls (also see FIG. 3). A helical motion, the so-called "Drehstrom," consisting of potential circulation flow and rotational flow is excited thereby. In the mixing zone located between the potential and rotational flows, due to the superimposed velocity fields, relative or coriolis forces occur between the potential and rotational flows which act, in addition to the centrifugal force, on the suspension particles in the aerosol. The suspension components are finally conveyed through the annular gap 5 into the collection space 6 and discharged through a discharge conduit 7. The purified aerosol carrier medium, for the gaseous type for example, leaves the separator or is drawn therefrom by suction through the outlet 8. A rotationally symmetrical body acting as a flow guide member 2 is located coaxial to and above the opening of the aerosol inlet 3 and is of such construction as to repeatedly increase in cross-sectional area and decrease in cross-sectional area successively as it extends from the aerosol inlet 3. The reduction in cross section per unit length in the axial direction is advantageously greater than the increase in cross section per unit of length. The flow body 2 as shown in FIG. 1 is end-supported on a pin extending from a flow guide plate located across the aerosol inlet 3.

The increase in the total percentage of separation is brought about by the following effects:

As viewed in FIG. 1, the aerosol flows from the bottom to the top, that is each particle in the aerosol has a velocity component in the axial direction. Moreover a rotational flow is superimposed upon the aerosol flow, that is each particle receives in addition a velocity component $v_u$ in the circulation direction. The physical rule that applies thereto is $v_u = \omega \cdot r$, wherein $\omega$ is the constant angular velocity and $r$ is the radical distance of the particle from the vortex chamber axis. Thus, the radially outwardly directed centrifugal force $K_z = m \cdot v_u^2 / r = m \cdot \omega^2 \cdot r$ is exerted on the particle. In the absence of the flow guide member 2, only small centrifugal acceleration and forces particularly act on the fine suspended particles of little mass located in the region of the vortex chamber axis. Consequently a specific time interval elapses before the fine suspended particles are able to reach the region of increased centrifugal forces and finally the mixing zone, in which coriolis and relative forces are effective as additional separating forces. Because of their velocity components in the axial direction, the fine suspended particles therefore flow through the separator in the region of its axis without being driven away into the outer separator region, where they will first become effectively separated from the carrier medium of the aerosol.

The flow guide member 2 acts, however, so that, above all, the singular separator axis is shielded from the aerosol flow. Furthermore, a velocity component is impressed radially outwardly on the aerosol in the region 9 in which the flow guide member 2 continuously increases in cross section in the aerosol flow direction, into a vortex source. The suspended particles are thus passed essentially more rapidly into the region of increased centrifugal forces. Furthermore, they retain their radially outwardly directed velocity component at the bend location 10 of the flow guide member 2, because of their greater inertia with respect to the aerosol carrier medium. They flow, therefore, behind or downstream of the bend location 10 further into the outer region of the dust separator, thus into the region of the mixing zone between the downwardly moving potential flow and the upwardly moving rotational flow, wherefrom they finally are conveyed by a descending branch of the potential flow into the collection space 6. The aerosol carrier medium flows again into a vortex sink in the region 11 of the flow guide member 2 with a velocity component inwardly radially directed toward the vortex chamber axis.

The taper of the flow guide member 2 in the region 11 consequently has the effect of promoting the separation, particularly, of the finest suspended particles from the carrier medium thereof at the bend location 10. It is advantageous to employ a flow guide member 2 as shown in FIG. 1 which has a plurality of portions having increasing cross-sectional area as viewed in the direction of flow and adjacent or subsequent portions of decreasing cross-sectional area respectively. A succession of sources and sinks are thus forcibly produced, at the transition locations of which (from source to sink) due to the bending of the path of the carrier medium, a large portion of the finest suspended particles are always transported from the middle of the separator to the outer region thereof and from there on a descending branch of the potential circulation flow into the collection space.

A suitably constructed guide plate or sheet 17 or several thereof can be located additionally in the aerosol inlet 3 for giving a preliminary twist or turn to the aerosol flow.

In the device shown in FIG. 2 there are also illustrated a succession of sources and sinks in the same direction as for the device of FIG. 1, forcibly produced through the cascaded telescoping of several funnel-shaped hollow members 12 having throat openings 15 extending in the axial direction of the aerosol inlet respectively into the opening of the preceding funnel except for the lowermost funnel 12 whose throat opening 15 extends into the mouth of the aerosol inlet. A funnel-shaped or substantially conical body 13 having no opening and no throat is located at the upper end of the cascade of hollow members 12. Vortex in which a portion of the fine suspended particles are entrained are formed at the edges or rims 14 of the hollow members 12. The additional advantage of the device shown in FIG. 2 is that the suspended particles concentrated in the vortices are drawn by suction through the funnel throats 15 and the separating action can consequently be improved thereby. A sufficient negative pressure or vacuum must be present at the throat 15 of the funnel extending into the mouth of the aerosol inlet 3. Suction is consequently applied by suitable means such as a pump (not shown) through the tube 15'.

In order to impress on the aerosol flow an additional velocity component in the circulation direction, a spiral guide coil 16 is provided on the outer side of the funnel 12 in the mouth of the aerosol inlet 3. This guide coil 16 imparts a preliminary twisting or turning to the aerosol flow.

As shown in FIG. 4, the embodiment of FIG. 2 is modified by providing a venturi-shaped constriction of the inlet tube 3 in addition to providing the helical guide plate 16 for producing the preliminary twisting or rotation of the aerosol so as to impart a velocity component thereto in a radially outward direction.

The improvement in separation efficiency of a dust separator having, for example, a diameter of 200 mm. by means of the device constructed in accordance with our invention can be more plainly realized from the comparative data of the following percentage fractions of dust removal:

(a) *without* preliminary rotation and *without* source effects or actions at a flow member:

| Grain size: | Percentage fraction of dust separation |
| --- | --- |
| 0–2$\mu$ | 72.9 |
| 2–4$\mu$ | 97.2 |
| 4–6$\mu$ | 99.0 |
| 6–10$\mu$ | 99.8 |
|  | 96.35 |

(b) *with* preliminary twisting or rotation and *with* source effects at a flow guide member:

| Grain size: | Percentage fraction of dust separation |
| --- | --- |
| 0–2$\mu$ | 84.7 |
| 2–4$\mu$ | 98.1 |
| 4–6$\mu$ | 99.8 |
| 6–10$\mu$ | 100.0 |
|  | 97.6 |

We claim:

1. In a vortex separtor for separating out particulate material entrained in a carrier fluid, the separator comprising a vortex chamber having a substantially cylindrical wall and a pair of opposite end walls, inlet means at one of said end walls for supplying a primary flow of carrier fluid with entrained material to said chamber in a circulatory path about a primary flow axis, outlet means at the other of said end walls for discharging the carrier fluid from said chamber, a collection space for the material separated from the carrier fluid, said collection space being located in said chamber and surrounding said inlet means, nozzle means in said substantially cylindrical wall for injecting secondary fluid in a direction tangential to the circulatory path of said primary flow and inclined with respect to said primary flow axis at a predetermined distance from said inlet means, said secondary fluid being injected along a helical flow path into said chamber and having a component opposed to said primary flow so that a circulatory secondary flow coaxial with said circulator primary flow is superimposed on said primary flow, said circulatory secondary flow having a vortex sink near said inlet means and a vortex source spaced from said inlet means along said primary flow axis, the improvement which comprises flow guide means having a rotationally symmetrical shape and extending coaxial to and inside said circulatory flows, said flow guide means having a plurality of lengths, each with an end of minimum cross-sectional area, an endmost one of of said lengths having said end thereof located at said primary flow inlet means, the cross-sectional area of said lengths of said flow guide means increasing to a maximum value in the primary flow direction from said ends of minimal cross-sectional area and then decreasing in said direction again to a minimum value, the rate of increase in cross-sectional area per unit length of said lengths of said flow guide means being greater than the rate of decrease per unit length thereof in a direction from said inlet means toward said outlet means.

2. In a vortex separator for separating out particulate material entrained in a carrier fluid, the separator comprising a vortex chamber having a substantially cylindrical wall and a pair of opposite end walls, inlet means at one of said end walls for supplying a primary flow of carrier fluid with entrained material to said chamber in a circulatory path about a primary flow axis, outlet means at the other of said end walls for discharging the carrier fluid from said chamber, a collection space for the material separated from the carried fluid, said collection space being located in said chamber and surrounding said inlet means, nozzle means in said substantially cylindrical wall for injecting secondary fluid in a direction tangential to the circulatory path of said primary flow and inclined with respect to said primary flow axis of a predetermined distance from said inlet means, said secondary fluid being injected along a helical flow path into said chamber and having a component opposed to said primary flow so that a circulatory secondary flow coaxial with said circulatory primary flow is superimposed on said primary flow, said circulatory secondary flow having a vortex sink near said inlet means and a vortex source spaced from said inlet means along said primary flow axis, the improvement which comprises a flow guide member having a rotationally symmetrical body extending coaxial to and inside said circulatory flows, said body having a plurality of lengths, each with an end facing toward said primary flow inlet means, said end of an endmost length of said body being located at said primary flow inlet means, each of said lengths having a cross-sectional area increasing to a maximum value in the primary flow direction from said end thereof and then decreasing in said direction to a minimum value, the rate of increase in cross-sectional area per unit length of said lengths of said body being greater than the rate of decrease per unit length thereof in a direction from said inlet means toward said outlet means.

3. Vortex separator according to claim 2, wherein said end of said body extends into said primary flow inlet.

4. In a vortex separator for separating out particulate material entrained in a carrier fluid, the separator comprising a vortex chamber having a substantially cylindrical wall and a pair of opposite end walls, inlet means at one of said end walls for supplying a primary flow of carrier fluid with entrained material to said chamber in a circulatory path about a primary flow axis, outlet means at the other of said end walls for discharging the carrier fluid from said chamber, a collection space for the material separated from the carrier fluid, said collection space being located in said chamber and surrounding said inlet means, nozzle means in said substantially cylindrical wall for injecting secondary fluid in a direction tangential to the circulatory path of said primary flow and inclined with respect to said primary flow axis at a predetermined distance from said inlet means, said secondary fluid being injected along a helical flow path into said chamber and having a component opposed to said primary flow so that a circulatory secondary flow coaxial with said circulatory primary flow is superimposed on said primary flow, said circulatory secondary flow having a vortex sink near said inlet means and a vortex source spaced from said inlet means along said primary flow axis, the improvement which comprises flow guide means having a rotationally symmetrical shape and extending coaxial to and inside said circulatory flows, said flow guide means comprisnig at least one hollow funnel-shaped member, said hollow funnel-shaped member having its smaller-diameter end extending into said primary flow inlet means, and a solid funnel-shaped member having its smaller-diameter end extending into the larger-diameter end of said hollow funnel-shaped member whereby said flow guide means has a cross-sectional area increasing to a maximum value in the primary flow direction from the end of said hollow funnel-shaped member that extends into said primary flow inlet means, then decreasing in said direction to a minimum value and further increasing to a maximum value, the rate of increase in cross-sectional area per unit length of said flow guide means being greater than the rate of decrease per unit length thereof in a direction from said inlet means toward said outlet means.

5. In a vortex separator for separating out particulate material entrained in a carrier fluid, the separator comprising a vortex chamber having a substantially cylindrical wall and a pair of opposite end walls, inlet means at one of said end walls for supplying a primary flow of carrier fluid with entrained material to said chamber in a circulatory path about a primary flow axis, outlet means at the other of said end walls for discharging the carrier fluid from said chamber, a collection space for the material separated from the carrier fluid, said collection space being located in said chamber and surrounding said inlet means, nozzle means in said substantially cylindrical wall for injecting secondary fluid in a direction tangential to the circulatory path of said primary flow and inclined with respect to said primary flow axis at a predetermined distance from said inlet means, said secondary fluid being injected along a helical flow path into said chamber and having a component opposed to said primary flow so that a circulatory secondary flow coaxial with said circulatory primary flow is superimposed on said primary flow, said circulatory secondary flow having a vortex sink near said inlet means and a vortex source spaced from said inlet means along said primary flow axis, the improvement which comprises flow guide means having a rotationally symmetrical shape and extending in a direction coaxial to and inside said circulatory flows, said flow guide means comprising a plurality of telescoping hollow funnel-shaped members axially aligned with each other and with said primary flow inlet means, the small-diameter ends of said hollow funnel-shaped members, except for an endmost member thereof, extending into the large-diameter ends, respectively, of succeeding hollow funnel-shaped members, the smaller-diameter end of said endmost hollow funnel-shaped member extending into said primary flow inlet means and a solid funnel-shaped member aligned with said hollow funnel-shaped members and having its smaller-diameter end extending into the large-diameter end of the other endmost hollow funnel-shaped member, whereby said flow guide means has a plurality of lengths in said primary flow direction having alternately increasing and decreasing cross-sectional areas beginning with the end of said hollow funnel-shaped member extending into said primary flow inlet means, the rate of increase in cross-sectional area per unit length of said flow guide means being greater than the rate of decrease per unit length thereof in direction from said inlet means toward said outlet means.

6. Vortex separator according to claim 5, including means for providing negative pressure at the small-diameter end opening of the endmost hollow funnel-shaped member extending into said primary flow inlet means whereby vortices formed by said flows at the edges of the respective large-diameter ends of said hollow funnel-shaped members and laden with entrained particulate material are drawn off through said hollow funnel-shaped members from the large-diameter end openings to the small-diameter end openings thereof.

7. In a vortex separator for separating out particulate material entrained in a carrier fluid, the separator comprising a vortex chamber having a substantially cylindrical wall and a pair of opposite end walls, inlet means at one of said end walls for supplying a primary flow of carrier fluid with entrained material to said chamber in a circulatory path about a primary flow axis, outlet means at the other of said end walls for discharging the carrier fluid from said chamber, a collection space for the material separated from the carrier fluid, said collection space being located in said chamber and surrounding said inlet means, nozzle means in said substantially cylindrical wall for injecting secondary fluid in a direction tangential to the circulatory path of said primary flow and inclined with respect to said primary flow axis at a predetermined distance from said inlet means, said secondary fluid being injected along a helical flow path into said chamber and having a component opposed to said primary flow so that a circulatory secondary flow coaxial with said circulatory primary flow is superimposed on said primary flow, said circulatory secondary flow having a vortex sink near said inlet means and a vortex source spaced from said inlet means along said primary flow axis, the improvement which comprises flow guide means having a rotationally symmetrical shape and extending in a direction coaxial to and inside said circulatory flows, said flow guide means comprising a plurality of lengths, each with an end of minimum cross-sectional area, an endmost one of said lengths having a portion with said end extending into said primary flow inlet means, the cross-sectional area of said lengths of said flow guide means increasing to a maximum value in the primary flow direction from said end of minimal cross-sectional area thereof and then decreasing in said direction again to a minimum value, the rate of increase in cross-sectional area per unit length of said lengths of said flow guide means being greater than the rate of decrease per unit length thereof in a direction from said inlet means toward said outlet means, and a spiral guide plate mounted on the outside of said flow guide means portion located in said primary flow inlet means for imparting to said primary flow, while in said primary flow inlet means, a velocity component in the direction of said circulatory path of said primary flow.

References Cited

UNITED STATES PATENTS

| | | | |
|---|---|---|---|
| 1,420,954 | 6/1922 | Bickel et al. | 55—457 X |
| 3,199,270 | 8/1965 | Oehlrich | 55—456 X |
| 3,199,272 | 8/1965 | Oehlrich et al. | 55—261 |

FOREIGN PATENTS 469,843  10/1953  Canada.

REUBEN FRIEDMAN, *Primary Examiner.*

J. DE CESARE, *Assistant Examiner.*